US008121336B2

(12) United States Patent
Hutt et al.

(10) Patent No.: US 8,121,336 B2
(45) Date of Patent: Feb. 21, 2012

(54) DIRECTIONAL LOUDSPEAKER TO REDUCE DIRECT SOUND

(75) Inventors: Steven W. Hutt, Bloomington, IN (US); Ryan Mihelich, Indianapolis, IN (US); William Neal House, Greenwood, IN (US); Mark Justin Armitage, Bloomington, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 1337 days.

(21) Appl. No.: 11/697,088

(22) Filed: Apr. 5, 2007

(65) Prior Publication Data

US 2008/0247575 A1 Oct. 9, 2008

(51) Int. Cl.
*H04R 1/02* (2006.01)
*H04B 1/00* (2006.01)

(52) U.S. Cl. .......................................... 381/387; 381/86

(58) Field of Classification Search .................... 381/86, 381/160, 302, 300, 305, 387, 338–340
See application file for complete search history.

(56) References Cited

U.S. PATENT DOCUMENTS 4,503,930 A 3/1985 McDowell .................... 181/145
4,596,034 A 6/1986 Moncrieff ........................ 381/89
4,653,606 A 3/1987 Flanagan ....................... 181/145
4,845,759 A 7/1989 Danley ............................ 381/97
5,023,914 A * 6/1991 Arnold ............................ 381/97
5,031,220 A * 7/1991 Takagi et al. .................... 381/86
5,109,416 A * 4/1992 Croft ............................. 381/304
5,526,325 A 6/1996 Sullivan et al. ............... 367/138
5,850,060 A * 12/1998 Gerber et al. ................. 181/175
5,870,484 A 2/1999 Greenberger ................. 381/300
6,179,359 B1 1/2001 Clauson et al. .............. 296/39.1
6,650,758 B1 11/2003 Van Schyndel ................. 381/97
6,778,672 B2 8/2004 Breed et al. ...................... 381/86
6,937,740 B2 8/2005 Dage ............................ 381/389
6,977,653 B1 12/2005 Cleary, Jr. et al. ............ 345/440
6,980,098 B2 12/2005 Shinada et al. ............... 340/439
6,996,239 B2 2/2006 Wood .............................. 381/17
7,092,541 B1 8/2006 Eberbach ...................... 381/300
7,120,261 B1 10/2006 Turnbull et al. ................ 381/86
7,130,431 B2 10/2006 Watson et al. .................. 381/86
7,134,687 B2 11/2006 Breed et al. .................... 280/735
7,136,494 B2 11/2006 Watson et al. .................. 381/86
7,139,402 B2 11/2006 Abe et al. ........................ 381/97

(Continued)

FOREIGN PATENT DOCUMENTS

EP 1 502 819 A2 2/2005

(Continued)

*Primary Examiner* — Curtis Kuntz
*Assistant Examiner* — Sunita Joshi
(74) *Attorney, Agent, or Firm* — Brinks Hofer Gilson & Lione

(57) ABSTRACT

A directional loudspeaker provides an enhanced listening environment by producing an indirect sound field of greater amplitude than that of the direct sound field. The directional loudspeaker includes loudspeaker elements positioned to provide a listener located below the loudspeaker elements with an impression of sound spaciousness in a vehicle environment. The loudspeaker elements may include baffles or acoustic lenses to deflect the indirect field away from the path to the listener position. The loudspeaker may also be operated with windows open by channeling the indirect sound field through an acoustic waveguide and deflector to the listener. A sound processor is also provided to accept a sound input, create an indirect and direct sound field, output the sound fields to loudspeaker elements, and also may provide electronic enhancement effects such as multi-channel sound or sound parameter adjustment.

11 Claims, 11 Drawing Sheets

U.S. PATENT DOCUMENTS

| | | | | |
|---|---|---|---|---|
| 7,146,010 | B1 | 12/2006 | Heed et al. | 381/1 |
| 7,164,117 | B2 | 1/2007 | Breed et al. | 250/221 |
| 7,164,768 | B2 | 1/2007 | Aylward et al. | 381/22 |
| 7,164,773 | B2 | 1/2007 | Fabry | 381/86 |
| 2004/0109575 | A1* | 6/2004 | Thigpen | 381/302 |
| 2006/0050907 | A1 | 3/2006 | Levitsky | 381/304 |
| 2006/0072773 | A1 | 4/2006 | Hughes, II et al. | 381/304 |

FOREIGN PATENT DOCUMENTS

| | | | |
|---|---|---|---|
| EP | 1 679 936 | A2 | 7/2006 |
| JP | 04126499 | | 4/1992 |
| JP | 05344580 | | 12/1993 |
| JP | 05344580 | A * | 12/1993 |
| JP | 2003230187 | | 8/2003 |
| JP | 2003230187 | A * | 8/2003 |

* cited by examiner

DIRECTIONAL LOUDSPEAKER TO REDUCE DIRECT SOUND

BACKGROUND OF THE INVENTION

1. Technical Field

The invention relates to loudspeaker directivity control. In particular, the invention relates to a loudspeaker for generating an indirect sound field greater than a direct sound field.

2. Related Art

Loudspeaker systems may be included in a variety of environments. One type of environment is a vehicle in which the loudspeaker system is coupled to an audio system. Loudspeaker systems may be placed throughout the vehicle to produce sound in the vehicle. The sound produced may be degraded because of the vehicle's interaction with the outside environment and the nature of the interior of the vehicle. For example, exterior vehicle noise such as road noise, wind noise, and surrounding vehicle sounds may interfere with the sound environment inside the vehicle.

As another example, the interior design and boundary walls of the vehicle may affect the acoustics of a vehicle audio system. Specifically, the placement of seats, passengers, and vehicle structures such a pillars, windows, and headliners may affect sound reflections. For audio systems that seek to reproduce multi-channel sound sources, or create an illusion of spaciousness within the vehicle, the available placement of speakers may not allow optimal, sound reproduction.

In home theater environments, the placement of listener positions and surrounding walls may affect the acoustics of the room. Listeners may want to experience a spaciousness of sound sources wherever they may be seated. Therefore, a need exists for a loudspeaker system that can produce a spacious sound experience within various environments.

SUMMARY

The disclosure provides an enhanced audio experience in an enclosed or partially enclosed environment with a multi-directional loudspeaker. One example of a multi-directional loudspeaker system includes a directional loudspeaker system. The loudspeaker may include loudspeaker elements that produce an indirect sound field greater than a direct sound field at a listener position. The loudspeaker elements may include dipole loudspeakers (such as electrodynamic planar loudspeakers). The loudspeaker elements may be mechanically baffled, or the loudspeaker elements may be configured with an acoustic waveguide and deflector to produce the indirect sound fields.

The invention also provides a sound processing system to implement a bidirectional loudspeaker system with electronic enhancement. The sound processing system may include an input unit, a sound processor, memory, and an output unit. The sound processor processes an input sound source to generate an indirect sound field greater than a direct sound field at a listener position.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
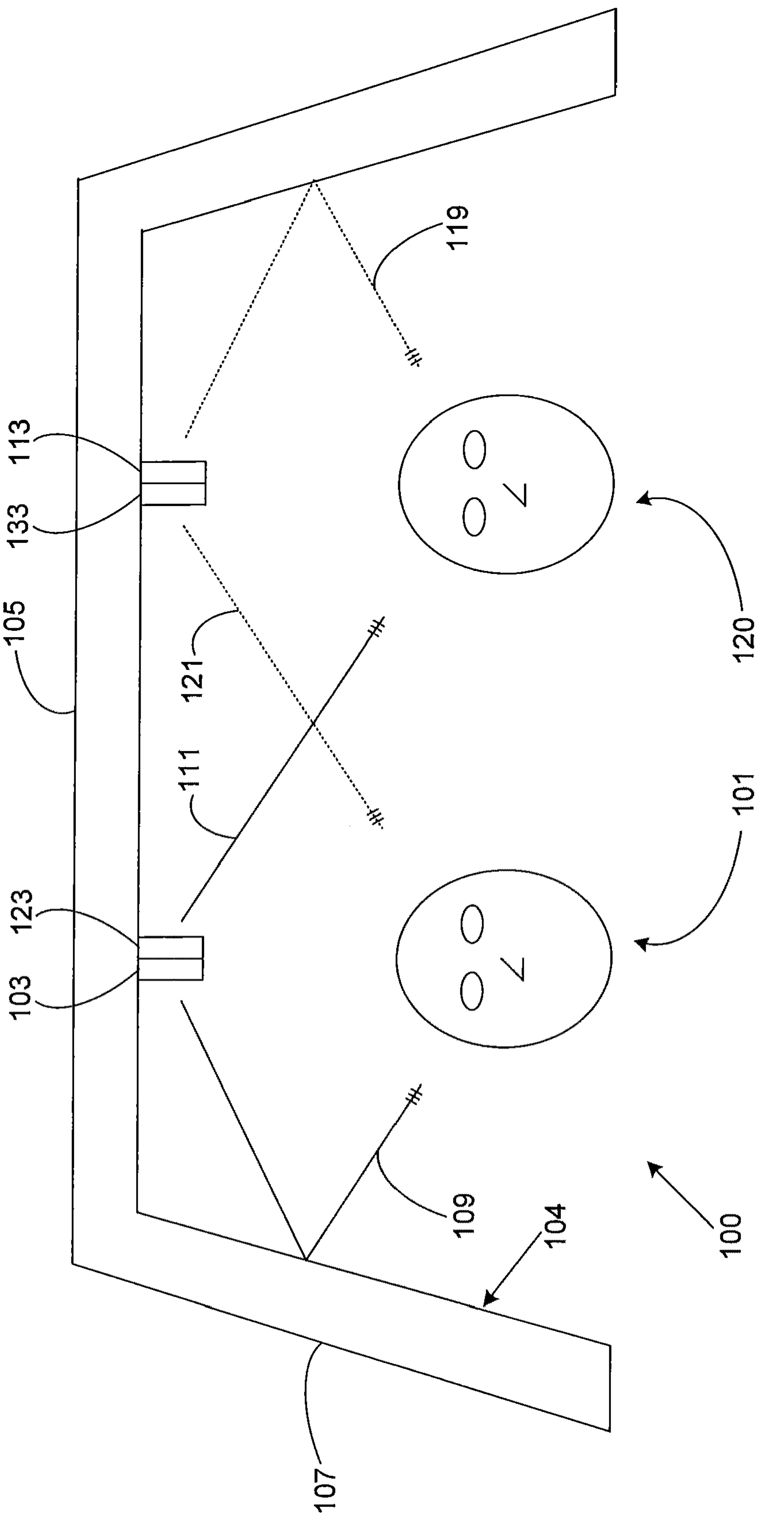
FIG. 1 illustrates an example directional loudspeaker system with two dipole loudspeaker elements.

FIG. 1 illustrates an example directional loudspeaker 100. The loudspeaker system 100 may be placed in an enclosure, such as a vehicle or a home theater environment. The vehicle or home theater environment may have boundary walls 104 defining the enclosure. The boundary walls may be ceilings 105, floors, windows 107, and walls. The loudspeaker 100 is configured to include one or more listener positions 101 and 120 where a listener may experience the output from the loudspeaker 100. The loudspeaker 100 may include at least one loudspeaker element 103 and 113. A loudspeaker element 103 or 113 may include a second loudspeaker element 123 or 133 positioned near the loudspeaker element 103 or 113 respectively. The second loudspeaker element 123 and 133 may allow the loudspeaker element 103 and 113 to operate in phase with respect to the sound fields radiated from the loudspeaker.

The loudspeaker elements 103 and 113 are mountably positioned integral with the boundary wall proximate a listener position. Placement of the loudspeaker elements 103 and 113 may include mounting the loudspeaker elements 103 and 113 in the ceiling or headliner of the vehicle, such that a loudspeaker element 103 or 113 may be mounted over the head of a listener positioned at one of the listener positions. The loudspeaker element 103 may be mounted within the ceiling or headliner of a vehicle such that the loudspeaker element 103 is wholly or nearly wholly contained below the surface of the ceiling or headliner. The loudspeaker element 103 may then be mounted with a fastener, locking ring, within a groove in the ceiling or headliner, or bolted, glued, or hinged to the ceiling or headliner. The loudspeaker element 103 and 113 may or may not be movable within its position within the boundary wall. The loudspeaker element 103 and 113 may be pivotably mounted to the ceiling or headliner.

The loudspeaker element 103 and 113 may be positioned approximately less than two to three feet from the listener position, or on the order of a few feet or less, depending on the configuration of the enclosed space. For example, in a large sport utility vehicle, the loudspeaker element 103 and 113 may be positionable approximately two to three feet from the listener position. In a smaller vehicle, such as a mid-size or compact vehicle, the loudspeaker element 103 and 113 may be positionable approximately one or two feet or less from the listener position.

Alternatively, the loudspeaker element 103 may extend partially away in a downward direction from the ceiling or headliner. In that case, the loudspeaker element 103 may be mounted with a fastener to the ceiling or headliner, and the loudspeaker element 103 may be positionable about its mounted position along the boundary wall to adjust the directionality of the sound waves emanating from the loudspeaker element 103. The loudspeaker element 103 may be further pivotable about either an axis extending perpendicular to the boundary wall plane, or pivotable about an axis formed along the intersection of the plane of the boundary wall surface and the fastening structure mounting the loudspeaker element 103 to the boundary wall.

The loudspeaker element 103 and 113 produces an indirect sound field 109 and a direct sound field 111 and 121. The indirect sound field 109 and 119 may reflect by at least one of the surfaces, such as the ceiling 105, floors (not shown), windows 107, or other surface of the enclosure 104. For example, in FIG. 1, the indirect sound field 109 is depicted reflecting by the window 107 of the vehicle. The direct sound field 111 and 121 is propagated substantially parallel to a straight line between the listener position 101 and the loudspeaker element 103 and 113. The direct sound field 111 and 121 may deviate slightly from the straight line between the listener position 101 and the loudspeaker element 103 and 113 because of diffraction around solid objects in the path of the direct sound field 111 and 121.

The indirect sound field 109 and 119 and the indirect sound field 111 and 121 produced by the loudspeaker elements 103 and 113 may arrive to create a sound experience for a listener positioned at the listener position 101 and 120. A location substantially beneath the loudspeaker element 103 and 113 is a null zone for sound fields, where the sound pressure in the null zone is substantially zero. The loudspeaker element 103 and 113 may provide directivity control for the sound fields radiated from the loudspeaker.

The loudspeaker elements 103 and 113 are configured so that the indirect sound field 109 is greater than the direct sound field 111 at the listener position 101 within the enclosure. A path length of the direct sound field 111 propagating from the first loudspeaker element 103 to the listener position 120 may be substantially equal to a path length of the indirect sound field 119 propagating from the second loudspeaker element 113 to the listener position 120.

The path that the indirect sound field 109 and 119 propagates along, including reflections by of surfaces, such as boundary walls 104 in the enclosure, creates an illusion of spaciousness for the listener located at the listener position 101 and 120.

The loudspeaker elements 103 and 113 may be dipole loudspeakers. Dipole loudspeakers have the property where the sound field produced by the opposing radiating surfaces of the loudspeaker create a dipole field, where the sound pressure in a direction substantially along the axis parallel to a radiating surface of the dipole speaker is null. Dipole loudspeakers may be implemented as a system of in-phase loudspeaker configured back-to-back together, such as the configuration shown in FIG. 1. A second loudspeaker element 123 or 133 may be combined with the loudspeaker element 103 and 113 to produce a direct sound field that is in-phase relative to a single loudspeaker element. The dipole loudspeaker may also be implemented as a commercially available system such as an electrodynamic planar loudspeaker.

The boundary walls 104 of the enclosure may be substantially reflective of sound waves incident on the boundary walls 104. Examples of suitable boundary walls include vehicle doors, windshields, side and rear windows, floors, seats, partitions, pillars, and seats located within a vehicle. In a home theater environment, examples of suitable boundary walls include side walls, windows, chairs, furniture, and other substantially hard furnishings.

Figure 2:
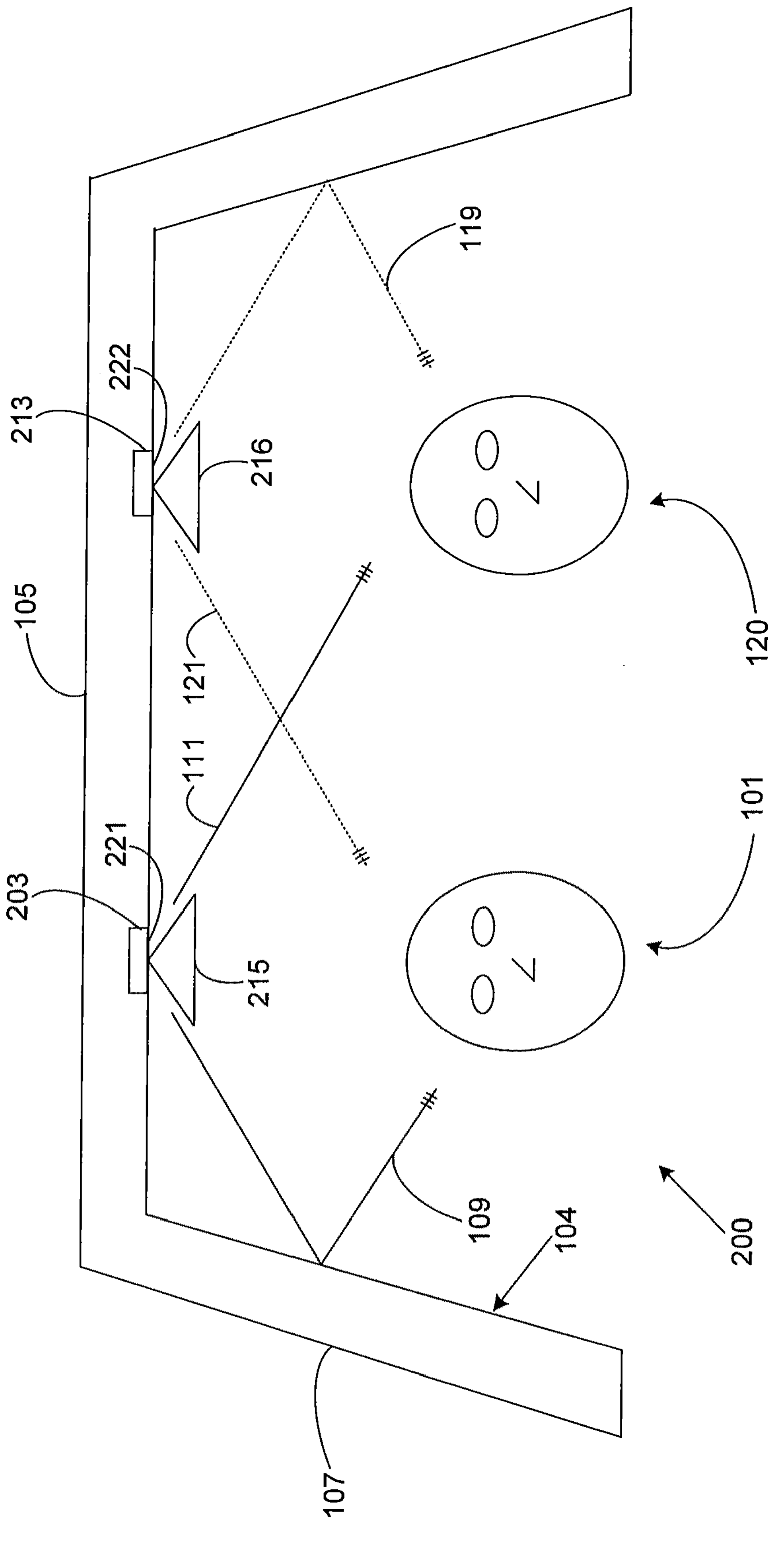
FIG. 2 illustrates an example directional loudspeaker system with two baffled loudspeaker elements.

FIG. 2 illustrates an example directional loudspeaker system 200 with two loudspeaker elements 203 and 213. The loudspeaker elements 203 and 213 depicted in FIG. 2 may be conventional loudspeaker systems with a channeling device acoustically coupled to the loudspeaker element, where the channeling device is operable to produce a greater indirect sound pressure than a direct sound pressure at a listener position.

In FIG. 2, the channeling device may be implemented as a mechanical baffle 215 and 216 positioned between the loudspeaker elements 203 and 213 and the listener positions 101 and 120. The baffle 215 and 216 may deflect the indirect sound field 109 and 119 from a direction directly below the loudspeaker element 203 and 213. The indirect sound field 109 may reflect by at least one of the boundary walls or surfaces, such as the ceiling 105, floors (not shown) or windows 107 of the enclosure 104. The direct sound field 111 and 121 may radiate from one loudspeaker element 203 to a listener position 120 not located directly below the loudspeaker element 203. Conversely, the direct sound field 111 and 121 from a different loudspeaker element 213 may radiate directly to a listener position 101 not located directly below the loudspeaker element 213. The position of the baffle 215 creates a zone of reduced sound field below the loudspeaker element 203 and 213. The indirect sound field 109 and 119 produced by the baffled mechanical loudspeaker 203 is greater than the direct sound field 121 at a listener position 101.

The loudspeaker element 203 and 213 may include a radiating surface 221 and 222 indicating the direction that sound may radiate from the loudspeaker element 203 and 213. The mechanical baffle 215 and 216 may be positioned proximate to the radiating surface 221 and 222. The mechanical baffle 215 and 216 may abut the radiating surface 221 and 222 of the loudspeaker element 203 and 213. The loudspeaker elements 103, 113, 203, and 213 need not be of the same configuration within the same loudspeaker system 100 and 200. The mechanical baffle 215 and 216 may have a dimension 50% greater than the lateral dimension of the loudspeaker element 103 and 113, such that the radius of the baffle 215 and 216 is greater than the radius of the loudspeaker element 103 and 113, but less than 1.5 times the radius of the loudspeaker element 103 and 113. Other baffle dimensions may be available corresponding to different vehicle or room environment configurations and/or acoustics.

The channeling device may also include an acoustic lens positioned proximate the radiating surface of the loudspeaker element and the baffle. The acoustic lens is further positioned between the radiating surface of the loudspeaker element and the baffle. The acoustic lens may be configurable to channel or focus the direct sound field radiated by the loudspeaker element 103. The acoustic lens may be configured to be approximately 20% of the width of the loudspeaker element 103 and 113. Other acoustic lens dimensions may be available corresponding to different vehicle or room environment configurations and/or acoustics.

Figure 3:
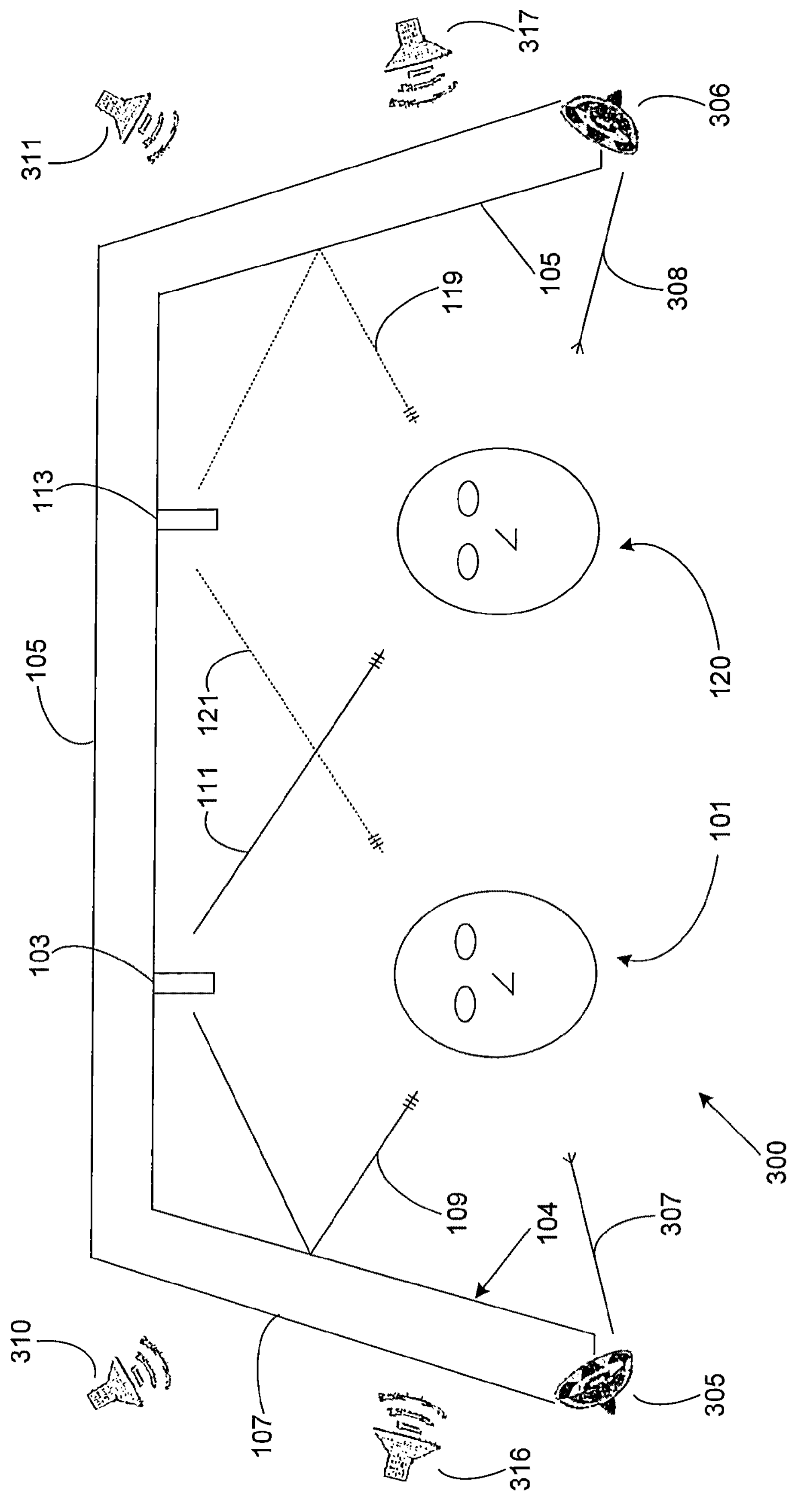
FIG. 3 illustrates an example directional loudspeaker system with summed loudspeaker sources.

FIG. 3 illustrates an example loudspeaker system 300 that indicates the position of "phantom speaker" locations. The loudspeaker system 300 includes one or more second loudspeaker elements 305 and 306. The second loudspeaker elements 305 and 306 may be positioned on the dashboard of a vehicle, in a pillar or other structural support of the vehicle, or in a center or rear console of the vehicle. The second loudspeaker elements 305 and 306 produce a direct sound field 307 and 308 radiated from the second loudspeaker elements 305 and 306 toward a listener position 101 and 120.

The indirect sound fields 109 and 119 produced by the loudspeaker elements 103 and 113, and which may be reflected by a boundary 104 and 105, may be perceived by a listener located at a listener position 101 and 120. The listener may perceive the indirect sound field 109 and 119 to be radiating from a "phantom source" location 310 and 311. This phantom source location may be perceived to be the location of the source of the indirect sound field, because the listener may only hear the apparent location of the indirect sound field 109 and 119. The actual location of the source of the indirect sound field 109 is the loudspeaker element 103 and 113. For certain dimensions and frequencies, the loudspeaker element 103 and 113 may provide a sharp, focused, indirect sound field "phantom speaker" 310 and 311.

When the indirect sound field 109 and 119 combines with the second loudspeaker direct sound field 307 and 308, the listener may perceive that the two sound fields 109 and 307 or 109 and 308 sum to produce a second "phantom loudspeaker" 316 and 317, where the listener may perceive the second phantom loudspeaker 316 and 317 to be positioned outside of the boundary 104 and 105. The second phantom loudspeaker 316 and 317 is perceived by the listener to be a sharply located loudspeaker, and not a diffuse sound source. The loudspeaker system 300 may therefore provide directivity control for spatial sound effects.

Figure 4:
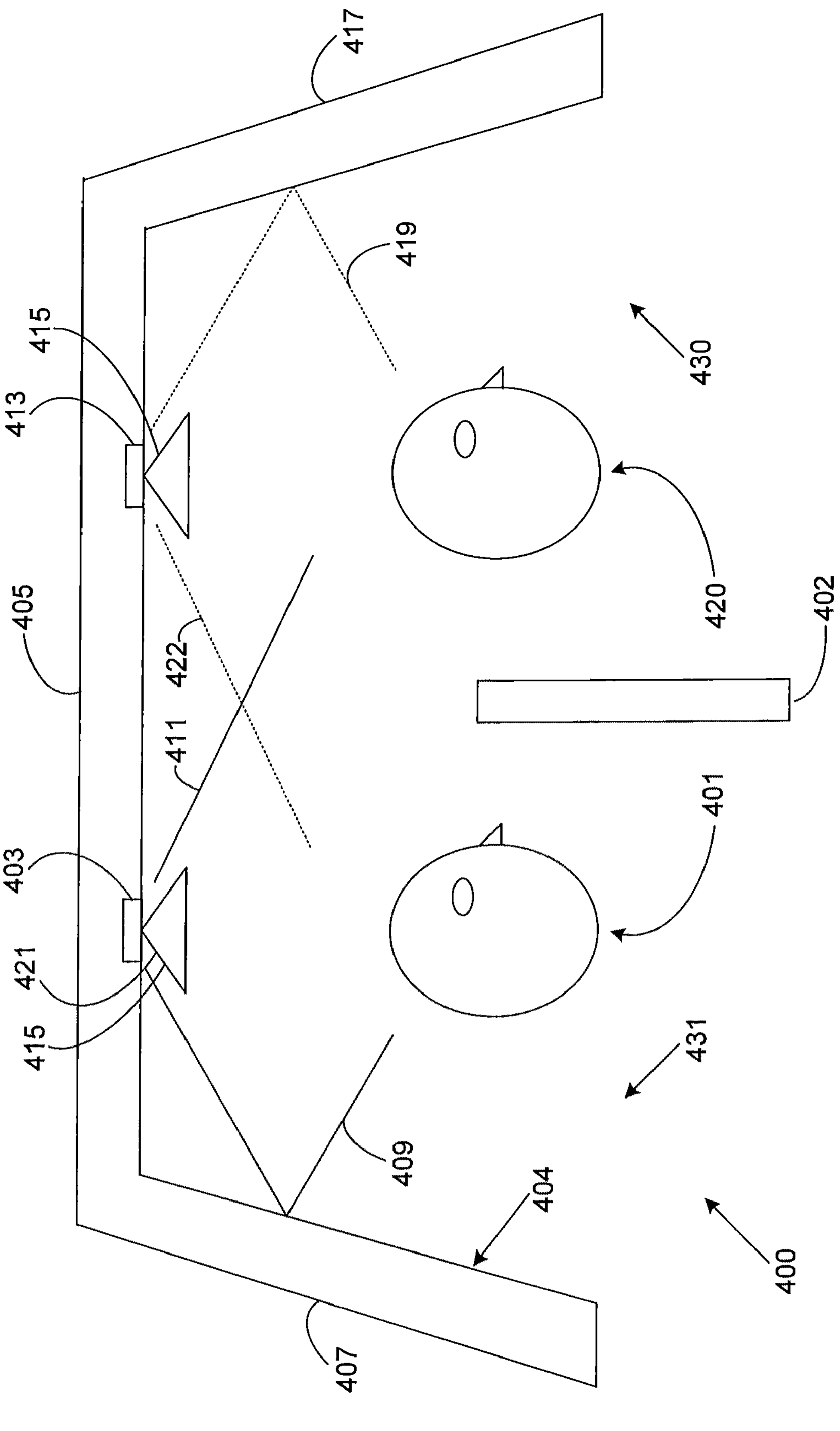
FIG. 4 illustrates an example directional loudspeaker system positioned in compartments of a vehicle.

FIG. 4 illustrates an example directional loudspeaker 400 including a vehicle separated into a front compartment 430 and a rear compartment 431 with two loudspeaker elements 403 and 413. The front compartment 430 includes a driver area and front passenger area, and the rear compartment 431 includes an area rearward of the front compartment 430. A partition 402, such as a seat or vehicle pillar, may separate the front compartment 430 from the rear compartment 431. At least one of the loudspeaker elements 403 may be located in the rear compartment 431, producing a direct sound field 411, and at least one of the loudspeaker elements 413 may be located in the front compartment 430, producing a direct sound field 422. The indirect sound field 409 produced by the loudspeaker element 403 may reflect by the rear window 407 of the rear compartment 431, and the indirect sound field 419 produced by the loudspeaker element 413 may reflect by the front windshield 417 of the front compartment 430. The loudspeaker 400 may be used when a listener wishes to hear multichannel sound, such as with Logic 7-configured loudspeaker systems. In such multichannel systems, it may be intended for the listener to perceive sound fields propagating from the rear of the vehicle. The loudspeaker 400 may provide rear-emanating sound fields for listeners positioned in the rear compartment 431 of the vehicle without excessive numbers of loudspeaker elements positioned throughout the rear compartment 431 of the vehicle, if even possible. The loudspeaker elements 103, 113, 203, and 213 may be in the same configuration or a different configuration within the loudspeaker system 400.

Figure 5:
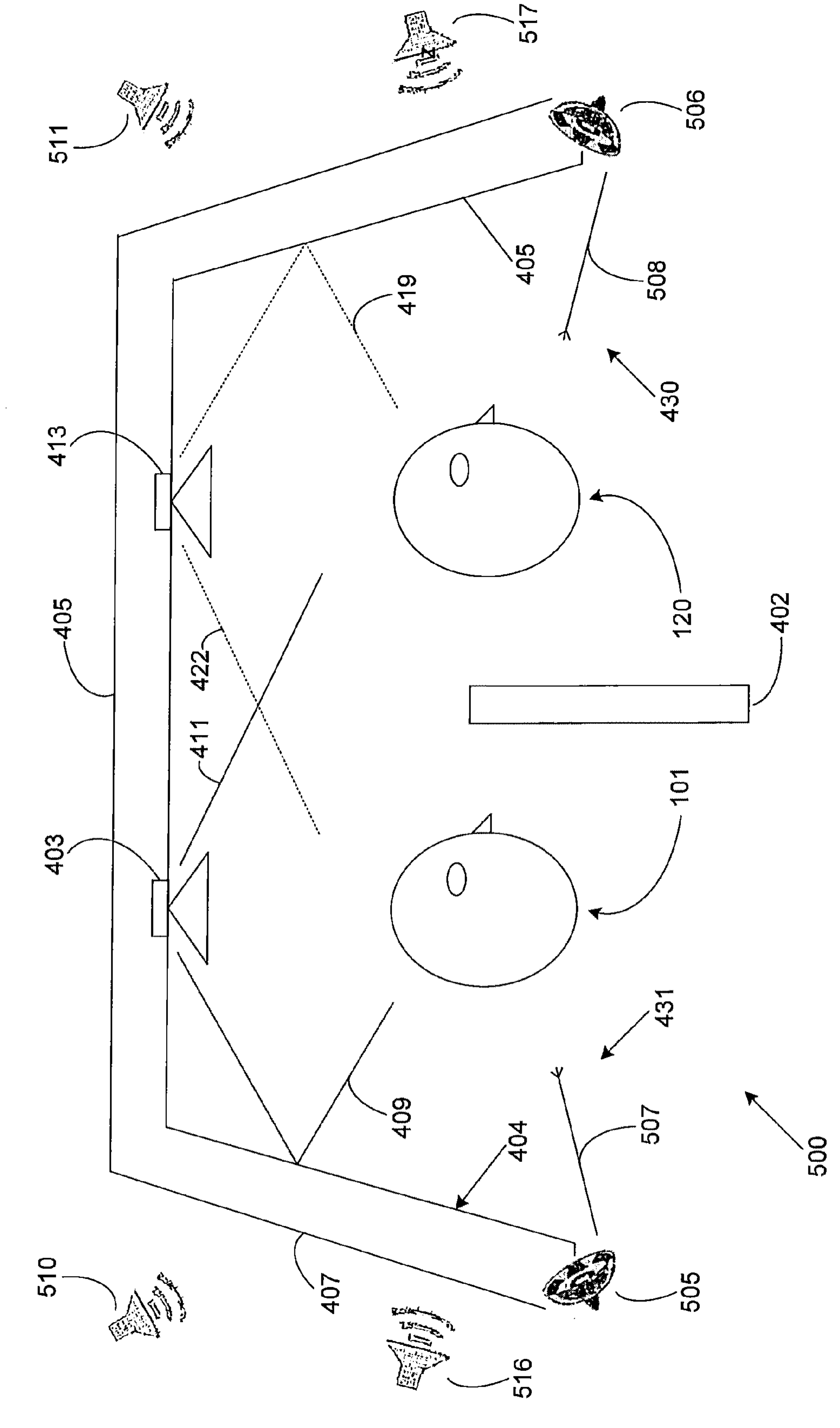
FIG. 5 illustrates an example directional loudspeaker system positioned in compartments of a vehicle with summed loudspeaker sources.

FIG. 5 illustrates an example directional loudspeaker system as in FIG. 4, with second loudspeaker elements 505 and 506. The second loudspeaker elements 505 and 506 may be positioned in a front dashboard, a front console, a rear panel, rear ledge, vehicle pillar, door, or other structural support. The second loudspeaker elements 505 and 506 may produce a direct sound field 507 and 508 radiated from the second loudspeaker elements 505 and 506 toward a listener position 101 and 120.

The indirect sound fields 409 and 419 produced by the loudspeaker elements 403 and 413, and which may be reflected by a boundary 404 and 405, such as the front windshield or rear window, and may be perceived by a listener located at a listener position 101 and 120. The listener may perceive the indirect sound field 409 and 419 to be radiate from a "phantom source" location 510 and 511. This phantom source location may be perceived to be the location of the source of the indirect sound field, because the listener may only hear the apparent location of the indirect sound field 409. The actual location of the source of the indirect sound field 409 and 419 is the loudspeaker element 403 and 413 respectively. For certain dimensions and frequencies, the loudspeaker element 403 and 413 may provide a sharp, focused, indirect sound field "phantom speaker" 510 and 511.

When the indirect sound field 409 or 419 combines with the second loudspeaker direct sound field 507 or 508, the listener may perceive that the two sound fields 409 or 419 and 507 or 508 sum to produce a second "phantom loudspeaker" 516 or 517. The listener may perceive the second phantom loudspeaker 516 and 517 is positioned outside of the boundary 404 and 405.

Figure 6:
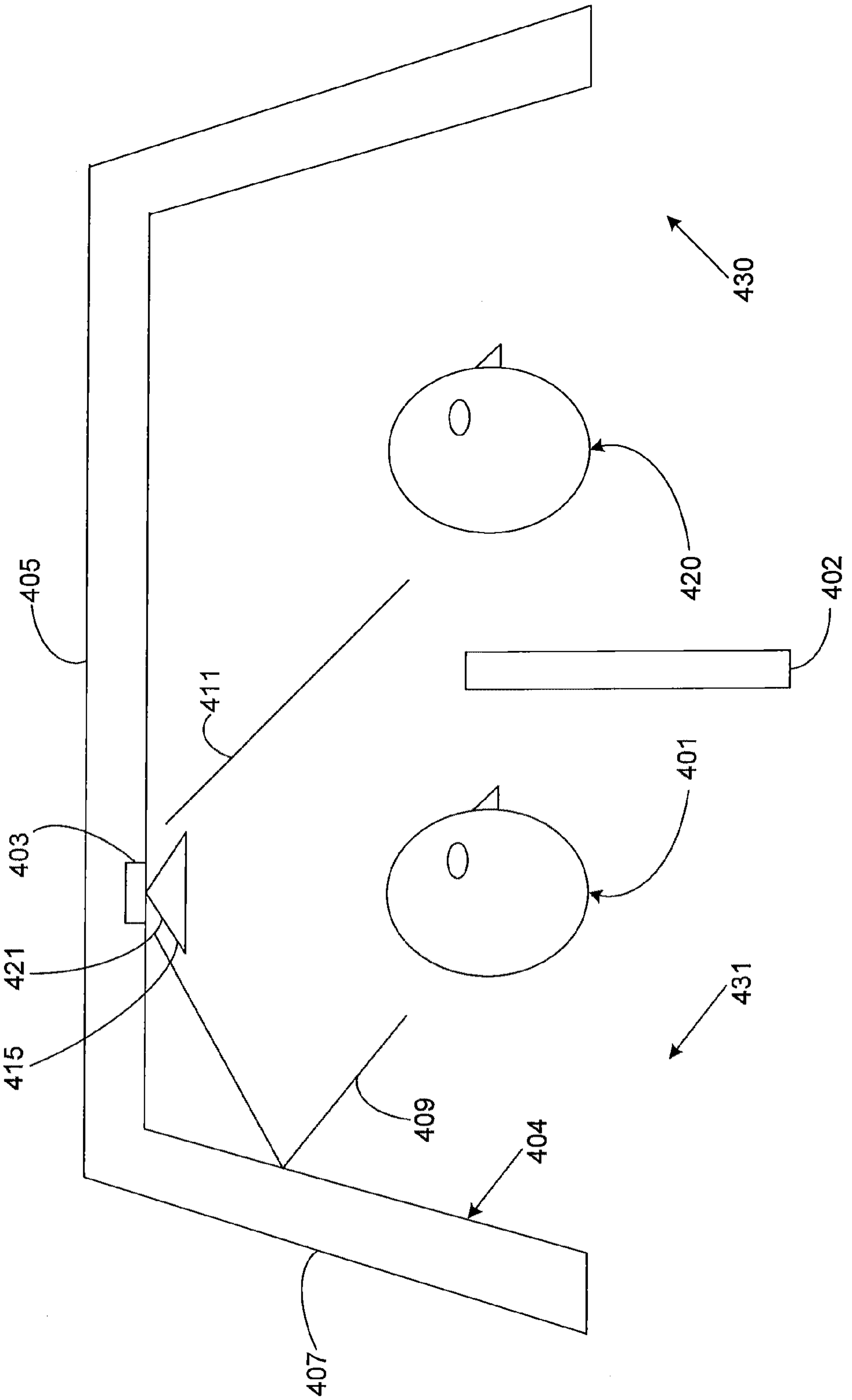
FIG. 6 illustrates an example directional loudspeaker system with a speaker placed in the rear compartment of a vehicle.

FIG. 6 illustrates an example directional loudspeaker system as in FIG. 4, where the loudspeaker system includes a vehicle separated into a front compartment 430 and a rear compartment 431 with one loudspeaker element 403 located in the rear compartment 430. The loudspeaker element 403 may be a loudspeaker system with a mechanical baffle 415 positioned between the loudspeaker element 403 and the listener position 401 positioned beneath the loudspeaker element 403. The loudspeaker element 403 may include a radiating surface 421, where the baffle 415 may be positioned proximate to the radiating surface 421. The baffle 415 may abut the radiating surface 421 of the loudspeaker element 403. The indirect sound field 409 produced by the loudspeaker element 403 may reflect by the rear window 407 of the rear compartment 431. The direct sound field 411 may radiate from the loudspeaker element 403 to the listener position 420 located in the front compartment 430 of the vehicle.

Figure 7:
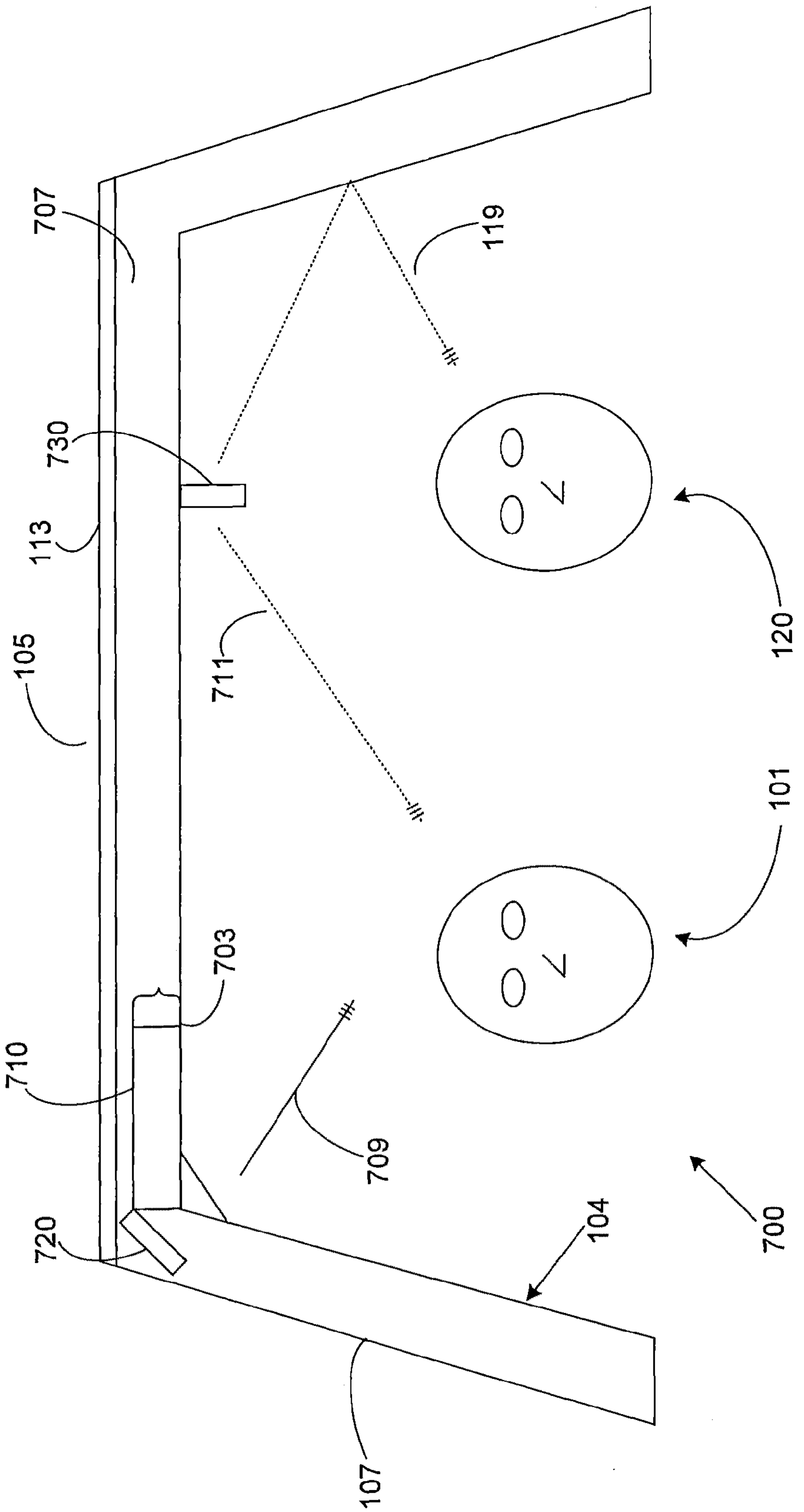
FIG. 7 illustrates an example directional loudspeaker system with one speaker output channeled along the headliner of a vehicle.

FIG. 7 illustrates an example directional loudspeaker system 700 where the loudspeaker element 703 may include a loudspeaker element 703, and where a channeling device may include an acoustic waveguide 710, and an acoustic deflector 720. The acoustic waveguide 710 may be positioned proximate to the loudspeaker element 703. The acoustic deflector 720 may be positioned proximate to the acoustic waveguide 710, and may be positioned to radiate an indirect sound field 709 towards a listener position 101. The acoustic waveguide 710 may be positioned along the ceiling 105 of the vehicle enclosure, such as a vehicle headliner. The acoustic deflector 720 may abut an intersection of the ceiling 105 and a boundary wall 104 of the enclosure. An example includes the corner joint of window and ceiling 105 of a window 107 in the vehicle. The loudspeaker system 700 may operate when the enclosure has an opening to an outside environment. The acoustic deflector 720 and waveguide 710 may function to provide an indirect sound field 709 to a listener positioned in the listener position 101 when a window next to the listener position 101 is open, for example. Without the acoustic deflector 720, the indirect sound field 709 may radiate out an open window and not reflect back to the listener. The acoustic deflector 720 may ensure that an indirect sound field 709 is provided to the listener in that circumstance to provide a sense of spaciousness to the listener The direct sound field 711 from the loudspeaker element 730 may propagate substantially parallel to a straight line between the listener position 101 and the loudspeaker element 710. The loudspeaker element 710 may be a dipole loudspeaker such as an electrodynamic planar loudspeaker.

Figure 8:
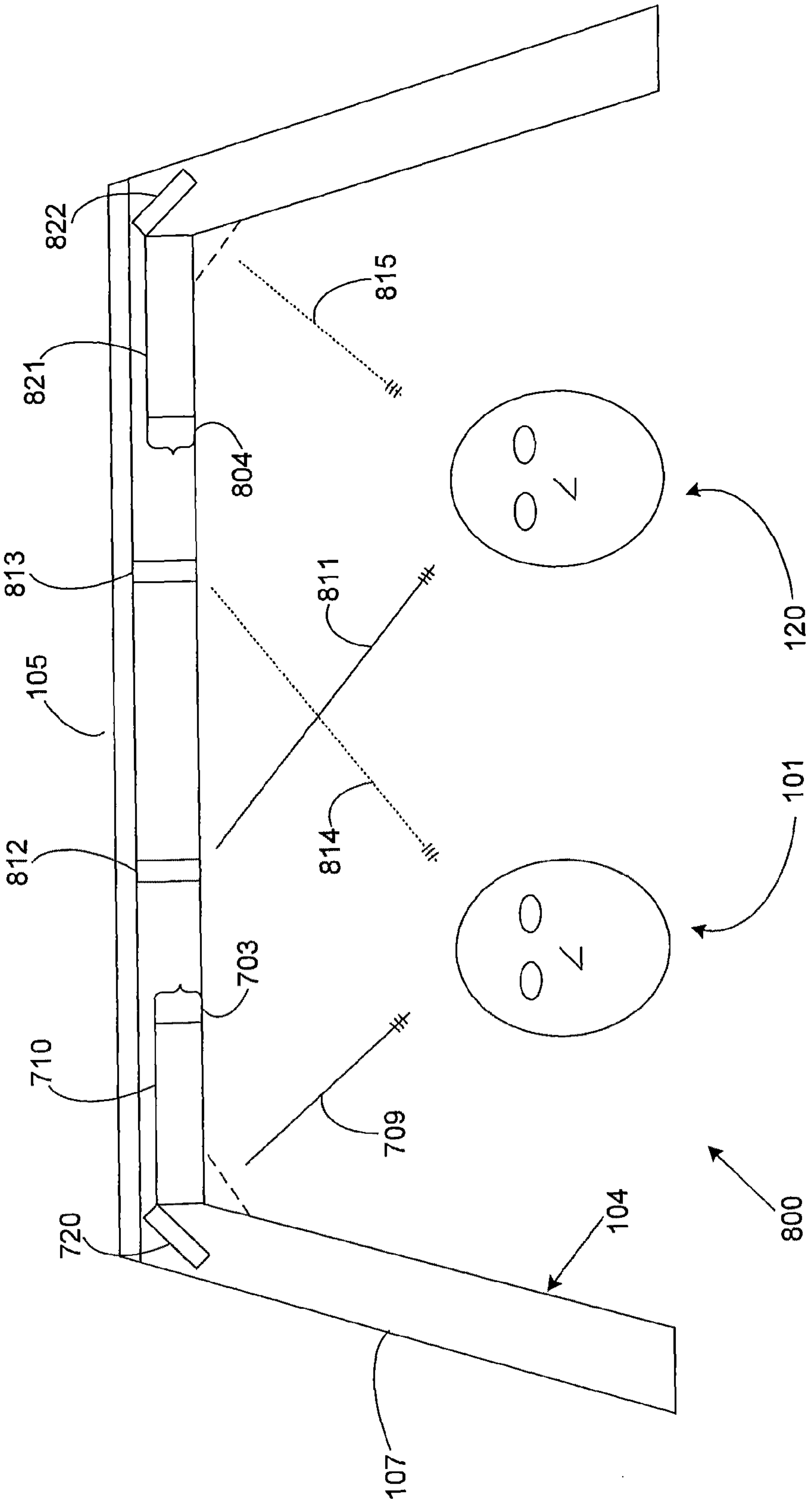
FIG. 8 illustrates an example directional loudspeaker with an acoustic waveguide and a channel.

FIG. 8 illustrates an example directional loudspeaker system 800 with a loudspeaker 703, an acoustic waveguide 710, and an acoustic deflector 720. The directional loudspeaker system 800 also may include a second loudspeaker 804, acoustic waveguide 821, and acoustic deflector 822 positioned opposite in configuration to the first loudspeaker 703, acoustic waveguide 710, and acoustic deflector 720, and operable to produce an indirect sound field 815. The indirect sound field 815 may propagate to the listener position 120 in a direction substantially parallel to a straight line between the acoustic deflector 822 and the listener position 120.

The directional loudspeaker system 800 may also include internal acoustic deflectors 812 and 813. The internal acoustic deflectors may be operable to produce indirect sound fields 811 and 814. The indirect sound field 811 may propagate from the loudspeaker 703, deflect from the internal acoustic deflector 812, and propagate to the listener position 120. The indirect sound field 814 may propagate from the loudspeaker 804, deflect from the internal acoustic deflector 813, and propagate to the listener position 101.

Figure 9:
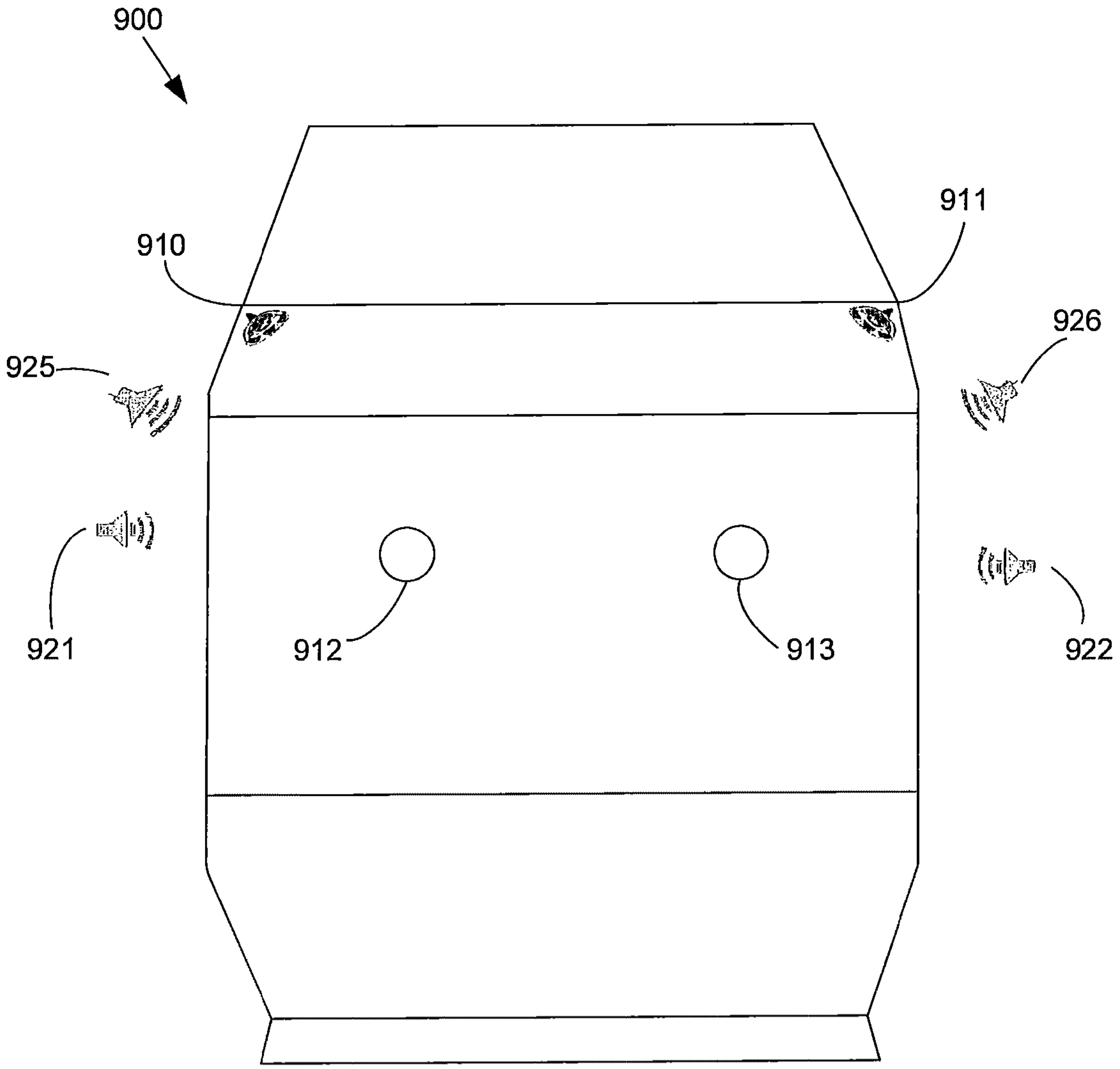
FIG. 9 illustrates the example directional loudspeaker system of FIG. 1 showing the virtual speaker locations of the indirect sound field.

FIG. 9 illustrates an example loudspeaker system 900 viewed from a location above the vehicle and looking down at the vehicle. The loudspeaker system 900 has a similar configuration to that illustrated in FIG. 3, in that a second loudspeaker element 910 and 911 may be positioned along a boundary of the vehicle along with the loudspeaker elements 912 and 913 positionable along the ceiling of the vehicle above a listener position. The loudspeaker elements 912 and 913 produce an indirect sound field, which, when reflected by a boundary, may be perceived by the listener as radiating from a "phantom loudspeaker" position 921 and 922. The configuration of the loudspeaker elements 912 and 913 may be such that for a certain range of frequencies, the phantom loudspeaker position 921 and 922 may be a sharply defined and localized position as perceived by the listener. The phantom loudspeaker position 921 and 922 therefore may not be perceived as a diffuse source.

The second loudspeaker element 910 and 911 may combine with the phantom loudspeaker 912 and 922 to produce a summed loudspeaker 925 and 926, which appears to radiate a sound field to the listener from a location that may be different from the locations of the second loudspeaker element 910 and 911 or the phantom loudspeaker location 912 and 922. The summed loudspeaker 925 and 926 may be perceived to be located at a position outside of the boundary, such as outside of the vehicle. The summed loudspeaker 925 and 926 may be perceived to be located at a defined position, rather than a diffuse source location. The summed loudspeaker 925 and 926 may therefore provide an illusion of spaciousness to the listener within the boundary.

Figure 10:
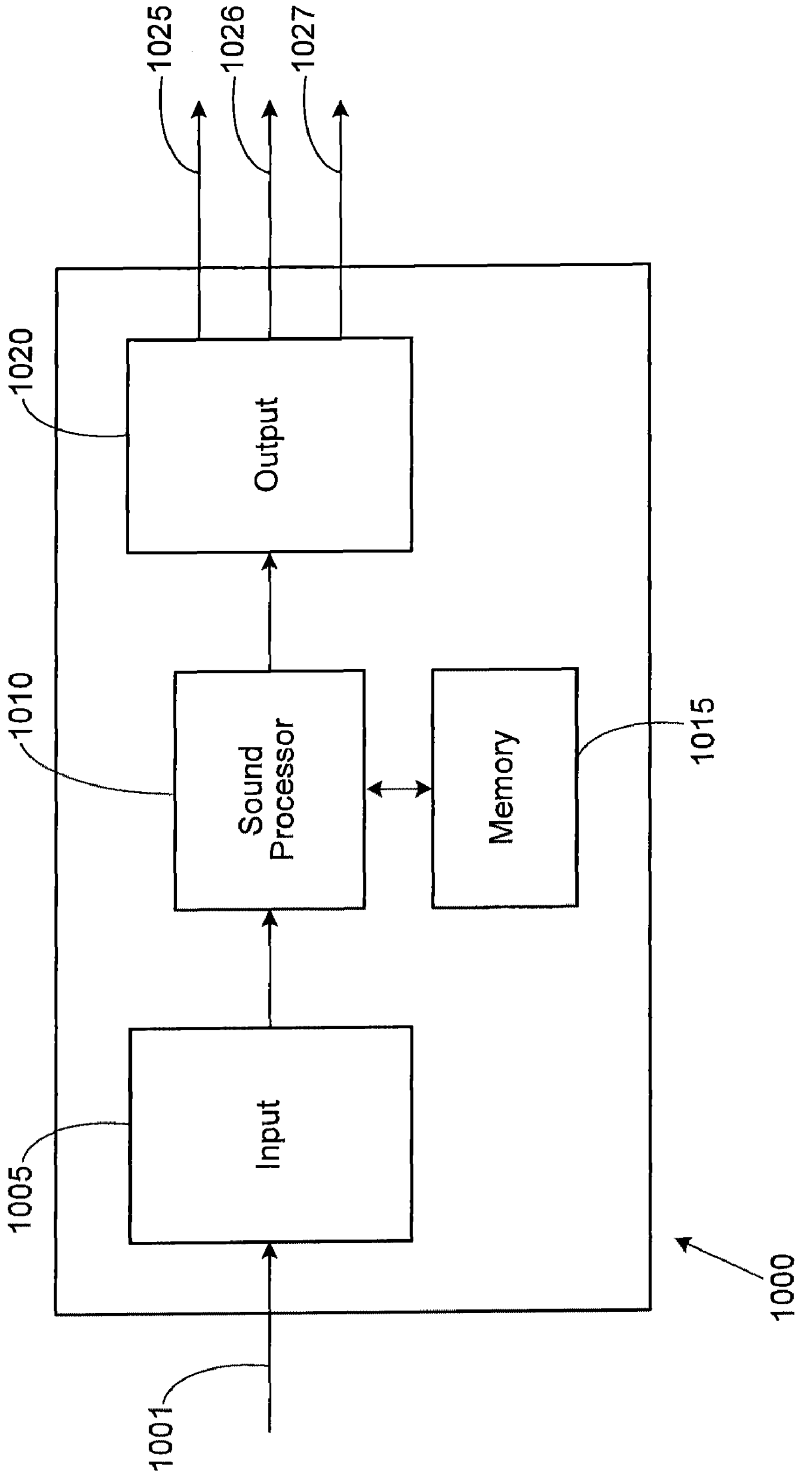
FIG. 10 illustrates an example sound processing system for creating an indirect and direct sound field in the directional loudspeaker system.

FIG. 10 illustrates an example loudspeaker processor 1000 adapted to operate with an automobile audio system and bidirectional loudspeaker 100-800 to adjust a phase, gain, or delay parameter of the sound field for electronic enhancement, such as for multichannel sound systems like Logic 7®. The loudspeaker processor 1000 may include an input sound source 1001, an input unit 1005, a sound processor 1010, a memory 1015, an output unit 1020, and one or more output signals 1025, 1026, and 1027. The loudspeaker processor 1000 may process a sound source input 1001 by receiving the sound source with an input unit 1005. The input unit 1005 may include a pre-processor or buffer for the sound source input 1001. A sound processor 1010 may adjust a phase, gain, or delay parameter of the sound field for electronic enhancement. The sound processor may also store a portion, or all of the sound source input 1001 in a memory 1015 for buffering or later retrieval. The memory 1015 may also store parameters for use by the sound processor 1010 in adjusting the sound source input 1001, such as gain, delay, and phase parameters. The sound processor may read these parameters from the memory 1015. The memory 1015 may also contain system parameters for creating the indirect sound field 109 and 119 and the direct sound field 111 and 121 output by the loudspeaker elements 103 and 113. The sound processor 1010 may generate the indirect sound field 109 and 119 and the direct sound field 111 and 121 based on the type of loudspeaker element 103 and 113 present, and may read any parameters necessary to generate the fields from the memory 1015. The memory 1015 may also integrate with the sound processor 1010 as a single unit.

An output unit 1020 following the sound processor 1010 may then be configured to process the indirect sound field 109 and 119 and the direct sound field 111 and 121 for output to the loudspeaker elements 103 and 113. The output unit 1020 may create one or more channels 1025, 1026, and 1027 (for example) for output to the loudspeaker elements 103 and 113. The output unit 1020 may, for instance, be configured to process the sound fields for multichannel distribution or to the different loudspeaker elements 103 and 113 present in the loudspeaker system 100-800.

The loudspeaker processing system 1000 may be implemented on a microprocessor or microcontroller multi-chip or integrated chip system. The loudspeaker processor 1000 may be implemented with digital signal processing (DSP) systems, as well as DSP algorithms encoded in firmware or instructions stored in the memory 1015.

Figure 11:
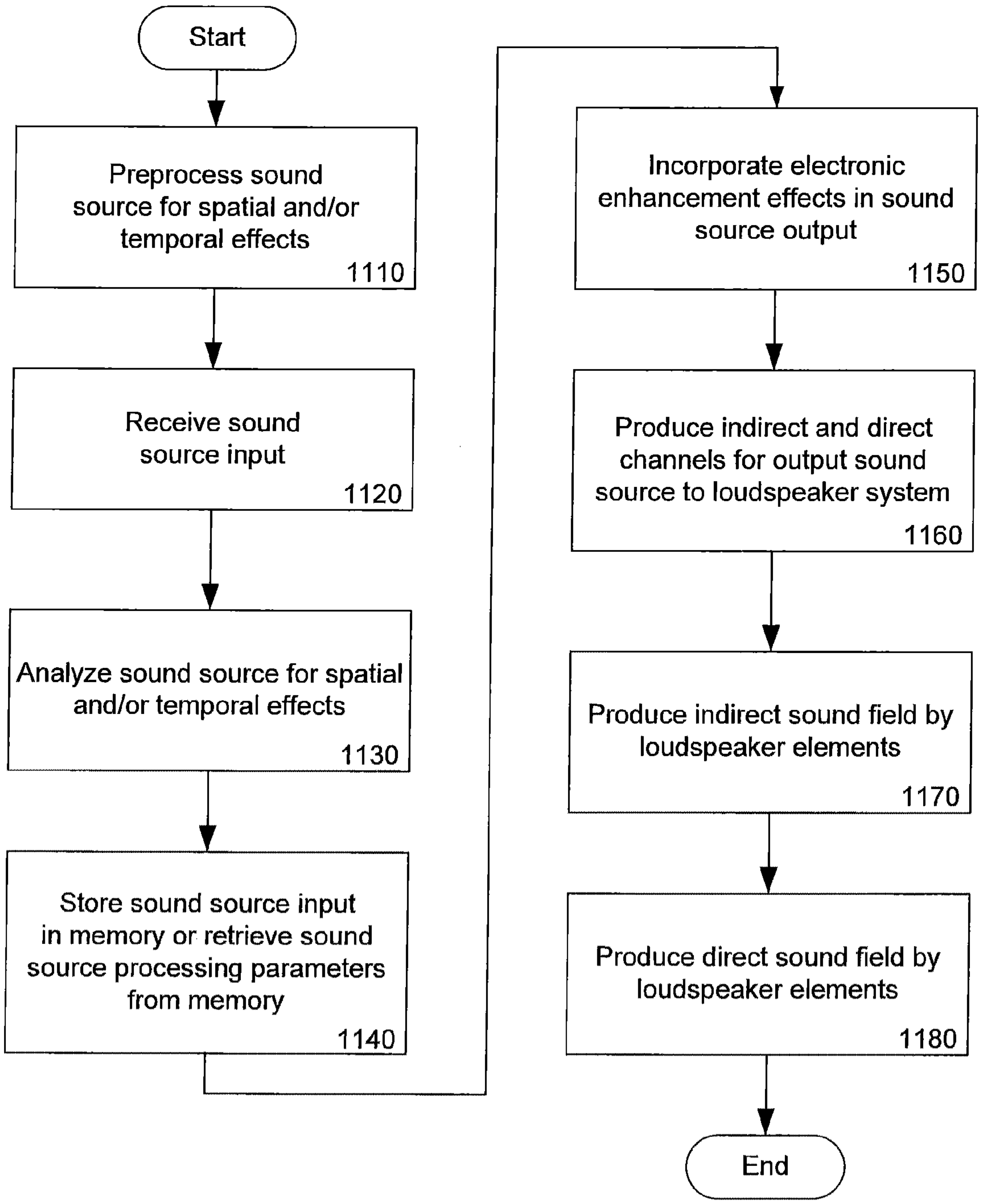
FIG. 11 illustrates an example process to create an indirect and direct sound field in the directional loudspeaker system.

FIG. 11 illustrates example acts that generate an indirect and direct sound field for a loudspeaker. The input sound source may be pre-processed, at act 1110, prior to reception by the loudspeaker by incorporating spatial and/or temporal effects to the input sound source. Such effects may include the "spaciousness" effects that the application replicates with the directional loudspeaker through the use of indirect and direct sound fields. Other effects may include multichannel sound effects, delays, equalization, or other electronic enhancements. A system designer may also relate specific vehicle architecture and acoustical characteristics with the input sound source, to modify the steering of the output sound source to correctly align the output sound source with the physical and non-physical (desired phantom speaker) aspects of the loudspeaker system. The loudspeaker system receives, at act 1120, the input sound source. The loudspeaker may analyze, at act 1130, the sound source for spatial and/or temporal effects included within the sound source. The analysis may be done by a sound processor 1000 or other processing units included with the loudspeaker. The loudspeaker may store the sound source, at act 1140, in a memory 1015 or the loudspeaker may retrieve one or more sound source processing parameters. Examples of the sound source processing parameters include parameters for generating the indirect and direct sound fields, acoustic environment specifications, and parameters for electronic enhancement. Other example sound source processing parameters include Logic-7® sound parameters associated with the input sound encoding. In addition, the memory 1015 may buffer all or part of the sound source for processing. The loudspeaker may then incorporate, at act 1150, electronic enhancement effects into the sound source, such as gain, delay, or phase parameters. The loudspeaker may produce, at act 1160, one or more channels of sound output including indirect and direct sound field streams. The loudspeaker may then produce an indirect sound field, at act 1170, by the loudspeaker elements in the loudspeaker. Finally the loudspeaker may produce, at step 1180, a direct sound field by the loudspeaker elements in the loudspeaker system.

The sequence diagram in FIG. 11 may be encoded in a signal bearing medium, a computer readable medium such as a memory, programmed within a device such as one or more integrated circuits, or processed by a controller or a computer. If the methods are performed by software, the software may reside in a memory resident to or interfaced to the sound processor 1000, a communication interface, or any other type of non-volatile or volatile memory interfaced or resident to the sound processor 1010, such as memory 1015. The memory may include an ordered listing of executable instructions for implementing logical functions. A logical function may be implemented through digital circuitry, through source code, through analog circuitry, or through an analog source such as through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A “computer-readable medium,” “machine-readable medium,” “propagated-signal” medium, and/or “signal-bearing medium” may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection “electronic” having one or more wires, a portable magnetic or optical disk, a volatile memory such as a Random Access Memory “RAM” (electronic), a Read-Only Memory “ROM” (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A loudspeaker system for placement in an at least partially enclosed space, the space having boundary walls including a ceiling boundary wall and a side boundary wall having an openable window and at least one listener position comprising:

a loudspeaker element mounted to the ceiling boundary wall above a listener position; and means for producing an indirect sound field including an acoustic deflector positioned adjacent to the openable window and an acoustic wave guide positioned along the ceiling boundary wall and acoustically coupling the loudspeaker element to the acoustic deflector, where the indirect sound field is reflected by the acoustic deflector before reaching the listener position to produce an indirect sound field that is greater than a direct sound field at the listener position even when the openable window is in an open position.

2. The loudspeaker system of claim 1, where the loudspeaker element comprises a dipole loudspeaker.

3. The loudspeaker system of claim 2, where the dipole loudspeaker comprises an electrodynamic planar loudspeaker.

4. The loudspeaker system of claim 1, where the at least partially enclosed space comprises a vehicle separated into a front compartment and a rear compartment, where the front compartment is a driver area and a front passenger area, and the rear compartment is an area rearward of the front compartment, and where at least one loudspeaker element is positionable in the front compartment, and at least one loudspeaker element is positionable in the rear compartment.

5. The loudspeaker system of claim 1, where the loudspeaker system is configured for use in a home theater environment.

6. The loudspeaker system of claim 1, where the at least partially enclosed space comprises a vehicle separated into a front compartment and a rear compartment, where the front compartment comprises a driver area and a front passenger area, and the rear compartment comprises an area rearward of the front compartment, and where at least one loudspeaker element is positionable in the rear compartment.

7. The loudspeaker system of claim 1, where the loudspeaker element is positionable in a headliner of a vehicle.

8. A loudspeaker system for placement in an at least partially enclosed space, the space having boundary walls including a ceiling boundary wall and a side boundary wall having an openable window and a listener position comprising: a loudspeaker element where the loudspeaker element is positionable integral with the ceiling boundary wall proximate a listener position, where the loudspeaker element comprises a loudspeaker, an acoustic deflector positioned adjacent to the openable window, and an acoustic waveguide coupling the loudspeaker and the deflector, and where the loudspeaker element is positioned at a first end of the acoustic waveguide and the deflector is positioned at a second end of the acoustic waveguide so that the indirect sound field is reflected by the acoustic deflector to produce a greater indirect sound field than a direct sound field at the listener position even when the openable window is in a open position.

9. The loudspeaker system of claim 8, where one of the boundary walls of the at least partially enclosed space comprises a ceiling and a headliner, and where the acoustic waveguide is positionable along the ceiling integral with the headliner.

10. A loudspeaker system comprising:

at least one loudspeaker element; and a channeling device acoustically coupled to the loudspeaker element, where the channeling device comprises an acoustic deflector situated adjacent to an openable window and an acoustic waveguide coupling the loudspeaker and the deflector, where the loudspeaker element is positionable at a first end of the acoustic waveguide and the deflector is positionable at a second end of the acoustic waveguide, and where the channeling device is operable to produce a greater indirect sound field than a direct sound field at a listener position even when the openable window is in an open position.

11. A loudspeaker system comprising:

at least one loudspeaker element including a radiating surface;

a baffle positioned proximate to the loudspeaker radiating surface and between the loudspeaker radiating surface and a listener position; and an acoustic lens positioned between the radiating surface of the loudspeaker element and the baffle, where the baffle and acoustic lens are operable to produce a greater indirect sound field than a direct sound field at the listener position.

* * * * *